United States Patent [19]

Edlund et al.

[11] Patent Number: 5,682,313
[45] Date of Patent: Oct. 28, 1997

[54] METHOD FOR LOCALIZATION OF BEACONS FOR AN AUTONOMOUS DEVICE

[75] Inventors: Leif Edlund, Uppsala; Rolf Berlin, Gothenburg; Charles R. Davidsson, Askim, all of Sweden

[73] Assignee: Aktiebolaget Electrolux, Stockholm, Sweden

[21] Appl. No.: 465,328

[22] Filed: Jun. 5, 1995

[30] Foreign Application Priority Data

Jun. 6, 1994 [SE] Sweden .................... 9401943

[51] Int. Cl.⁶ .................... G01S 1/00; B62D 1/02
[52] U.S. Cl. .................... 364/424.027; 364/424.031; 364/449.4; 342/127; 342/385; 342/357; 356/3
[58] Field of Search .................... 364/424.02, 443, 364/444, 447, 449, 456, 460, 451, 424.027, 424.028, 424.031, 423.098, 444.1, 449.4; 340/903, 904; 342/47, 53, 127, 146, 150, 357, 385, 450, 455; 356/3, 141.1, 141.2; 367/99, 103, 118, 127; 180/167, 169

[56] References Cited

U.S. PATENT DOCUMENTS

| 4,114,711 | 9/1978  | Wilkins        | 180/169    |
| 4,119,900 | 10/1978 | Kremnitz       | 364/424.02 |
| 4,674,048 | 6/1987  | Okumura        | 364/424.02 |
| 4,700,424 | 10/1987 | Hagen          | 15/250.04  |
| 4,710,020 | 12/1987 | Maddox et al.  | 364/424.02 |
| 4,817,000 | 3/1989  | Eberhardt      | 364/443    |
| 4,829,442 | 5/1989  | Kadonoff et al.| 364/449    |
| 4,858,203 | 8/1989  | Hansen         | 367/103    |
| 4,887,415 | 12/1989 | Martin         | 56/10.2 R  |
| 5,076,690 | 12/1991 | Devos et al.   | 356/141.1  |
| 5,165,064 | 11/1992 | Mattaboni      | 356/141.2  |
| 5,279,672 | 1/1994  | Betker et al.  | 134/18     |
| 5,377,106 | 12/1994 | Drunk et al.   | 180/169    |
| 5,491,670 | 2/1996  | Weber          | 367/127    |

FOREIGN PATENT DOCUMENTS

| 313409  | 8/1969  | Sweden .        |
| 364574  | 11/1974 | Sweden .        |
| 619799  | 10/1980 | Switzerland .   |
| 1403860 | 8/1975  | United Kingdom .|

OTHER PUBLICATIONS

"Position Estimation for an Intelligent Mobile Robot" 14 Feb. 1984, James L. Crowley, The Laboratory for Household Robotics, The Robotics Institute, Carnegie–Mellon University, pp. 1–23.

Primary Examiner—Kevin J. Teska
Assistant Examiner—Tan Nguyen
Attorney, Agent, or Firm—Young & Thompson

[57] ABSTRACT

The present invention provides an improved method for determining a coarse direction in an orientation system of a an autonomous device (10), for instance a dust cleaning robot together with a system of active beacons or transponders. A transmitter (20) for transmitting sensing signals is displaced in relation to the rotational center (25) of the the device (10). When the device is rotated around a vertical rotational axis in the rotational center, a minimum in the distance to the respective transponder or beacon is obtained when the transmitter of the device is positioned immediate to a point lying on a straight line between the rotational center of the device and a respective transponder, whereby an immediate coarse determination of the direction to each transponder is directly obtained. From such an immediate direction determination direct better starting values are obtained for a position calculation by means of for example Kalman filtering, by which successively from the signals obtained by these transponder responses an orientation basis is achieved for the area where the device should be acting.

10 Claims, 3 Drawing Sheets

METHOD FOR LOCALIZATION OF BEACONS FOR AN AUTONOMOUS DEVICE

TECHNICAL FIELD

The present invention refers to an autonomous device, for instance in the form of an autonomous and self orientating vacuum cleaner, which orientates by a system of transponders or beacons and more exactly the invention refers a method to faster determine a direction to the different transponders or beacons during the build-up of an orientation data base by means of which the device may then freely move and perform a function.

BACKGROUND OF THE INVENTION

For many years there has been a desire to provide, for instance, an autonomous apparatus for floor treatment, particularly a vacuum cleaner, which is controlled by a sensing system sweeping around the horizon in analogy, for example, with a ship radar. Then the desire is, that the apparatus should be able to orientate by itself in a room, such that it, for instance, will be able to perform a cleaning function according to a predetermined pattern or a predetermined strategy and at the same time avoid colliding with different obstacles, which may be arranged in the room, besides avoiding collisions with the walls of the room.

A patent document SE 313,409 from 1969 discloses a device for an independently operating apparatus for floor treatment, which is provided with a pair of wheels driven by an electric motor. This device is characterized in that one of the wheels is automatically releasable against the action of a spring when the apparatus meets an obstacle, whereby the pair of wheels may be turned around a vertical axis, and the moving direction of the apparatus may be changed and additionally the direction of wheel rotation may be switched so that the apparatus in principle can move and avoid the obstacle. Additionally, the device is guided by a controller, which generally guides the travel of the device over the surface to be cleaned.

Also a document SE 364,574 discloses a corresponding device, which on its front side is provided with an obstacle detection device having sensing means delivering electric signals and by which the width of obstacles, in the course of the device, may be determined. The sensing means operate completely mechanically and preferably consist of microswitches.

In GB 1,403,860 is disclosed a process and a device for automatic treatment, e.g., cleaning of a bounded area, whereby the device will move over the entire area and automatically change its course at the area boundaries. Anyhow, the device cannot in advance detect other obstacles present within the bounded area and follows in principle a predetermined program to cover all the surface of the bounded area.

Another such apparatus system is further disclosed in a document CH 619,799 from 1973. This apparatus, which is driven by two wheels, is arranged with an electro-optical measuring device, which displays several beam inputs and outputs. The measuring device serves to measure the distances between the apparatus and measuring points on the walls limiting the room. The measured points are entered into a coordinate calculation processor, which calculates, correlates and controls, respectively, the coordinates of the measuring points and stores these calculated values in an orientation memory. By means of a path counter connected to the wheels the motion of the apparatus is additionally calculated and the apparatus is guided by means of this information to by itself systematically travel over the entire surface of the floor for cleaning that surface.

A drawback here is the difficulty to locate obstacles which may be present in the course of the apparatus in its travels over the floor as an electro-optical sensing system which, due to the high propagation speed, demands a measuring system capable of measuring very short time periods, why, first of all, such a system, even still with the recent developments taken place within electronics and computer technique, will be so expensive that it above all from the point of price level cannot be made available to the public. Thus, it is still technically seen difficult with such an electro-optical method to measure short distances with a satisfactory resolution.

In an document from 1984 by James L. Crowley having the title "Position Estimation for Intelligent Mobile Robot", The Laboratory for Household Robotics, Carnegie-Mellon University, a solution of the problem to maintain an estimate of the position of the robot is further described when it travels in either a known or unknown environment. The document additionally gives a number of further references to different algorithms used for modelling in this context and which may be used to program a computer for the guidance of such a robot. An apparatus demonstrated in the document utilizes in part encoders at the robot's wheels to determine its travel and in part a rotating sensor sensing the distance to exterior surfaces having a beam with a starting diameter of approximately 7.5 cm and a beam spread of about 3°. The sensor rotates at about 1 revolution per 5 seconds and returns the distance to the nearest surface within 6 m to a resolution of 3 cm. The apparatus may then be placed into a learning mode during a guided tour of the world where it is supposed to act. Starting from the learn mode the apparatus will then from some starting point by itself orientate in this now explored environment.

In U.S. Pat. No. 4,674,048 is disclosed a guiding system for a mobile robot, which calculates its momentary position and sequentially stores data of the obtained positions and which information then is used for the continuing travel of the robot. The robot then calculates a travel pattern within a specified area, whereby it is allowed to travel within the range without leaving any region untravelled and taking notice of possible obstructions which alters its course. Besides the robot compensates position errors due to slippage of its drive wheels or errors in the operation of its motors.

There are additionally many other documents like for example U.S. Pat. Nos. 4,114,711 (1978), 4,700,424 (1987), 4,887,415 (1989) which also disclose different arrangements in automatically guided autonomous machines.

Common to all these previous designs is that they because of the multiplicity of differently combined methods needed for their orientation and steering most often will be of a clumsy size and above all they are utterly complicated and expensive to produce. Therefore there is a desire to provide a method which may be applied in a system of an autonomous device, which by way of this method still will be possible to manufacture at reasonable production costs, such that a ready-made product, for instance, for automatic vacuum cleaning of a room will be provided at a total price, which makes the product available to the public.

SUMMARY OF THE INVENTION

According to the present invention an improved method for orientation is provided for an autonomous device, comprising a microprocessor system and a sensing system having transmitter means and receiver means cooperating with active beacons or transponders, which also contain both receivers and transmitters.

According to a first object of the method of the present invention the transmitting means of the device, which transmits a signal for localizing of the transponders, is positioned different from the vertical rotational center of the device around which the device may be rotated, whereby when the device leaves a docking position it is rotated at least one turn around its rotational center at the same time as its microprocessor system registers distances to all available transponders or beacons from which a response is obtained.

According to a second object of the method of the present invention the microprocessor system of the device registers for each transmitted sensing signal its rotational angle related to a position when the rotation was started, whereby in processing of the measuring data a distance minimum is obtained to each registered transponder when the transmitting means of the device is in a position immediate to a straight line between the rotational center of the device and the respective transponder, by means of which an immediate coarse determination of a direction to each transponder is achieved for the present position of the device in a relative coordinate system having its reference point in the starting point of the device, i.e. the docking position.

According to a third object of the method of the present invention the rotation around the rotational center may be repeated at least once when for instance the device has traveled a predetermined distance from its starting point to obtain additional direction measurements for a coarse determination of the positions of the transponders.

According to a fourth object of the method of the present invention in part one wave of a first frequency of preferably relatively slow propagation and in part another wave of a second frequency having a preferably very high propagation speed are utilized, whereby the first wave is a longitudinal wave, preferably within the ultrasound range while the second wave is an electromagnetic wave, preferably an IR light signal or a micro wave signal.

According to a preferred embodiment of the present invention the signal on the first frequency having the slow propagation is omnidirectionally transmitted from the transmitting means of the autonomous device.

According to an additional object of the method of the present invention a response on the second frequency of fast propagation is delayed from a transponder by a certain predetermined time period to give the autonomous device time to process reflection on the first wave frequency for sensing of the proximate range of the autonomous device, whereby by means of the microprocessor system is created a an orientation basis for the further automatic travel of the autonomous device by means of in part the responses from the transponders and in part from the processing of reflections of the first frequency within a predetermined time window.

Additionally according to the present invention each transponder is identified by the microprocessor from the content of its response which states the unique identity of the transponder.

According to still an additional object of the method of the present invention a transponder additionally transmits, after transmission of a response indicating a received wave of the first or second frequency, after for each transponder a further determined time interval a second response on the first or second frequency is transmitted to give a further possibility to separate transponders which first responses for instance were received simultaneously.

DESCRIPTION OF THE DRAWINGS

The invention will be described in form of a preferred embodiment by making reference to the accompanying drawings, in which.

AN ILLUSTRATIVE PREFERRED EMBODIMENT

General Description

Figure 1:
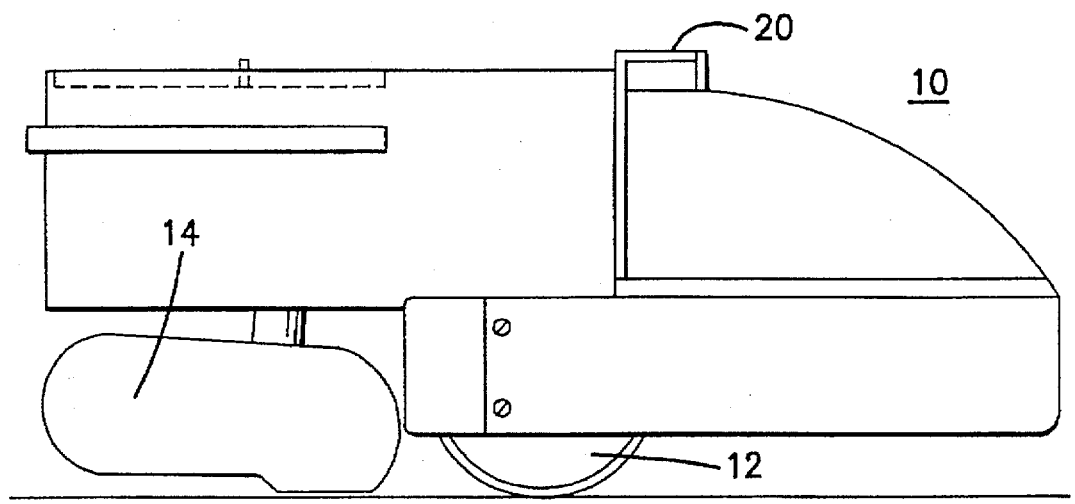
FIG. 1 demonstrates a side view of an embodiment of an autonomous device as a vacuum cleaning robot according to the present invention.
Figure 2:
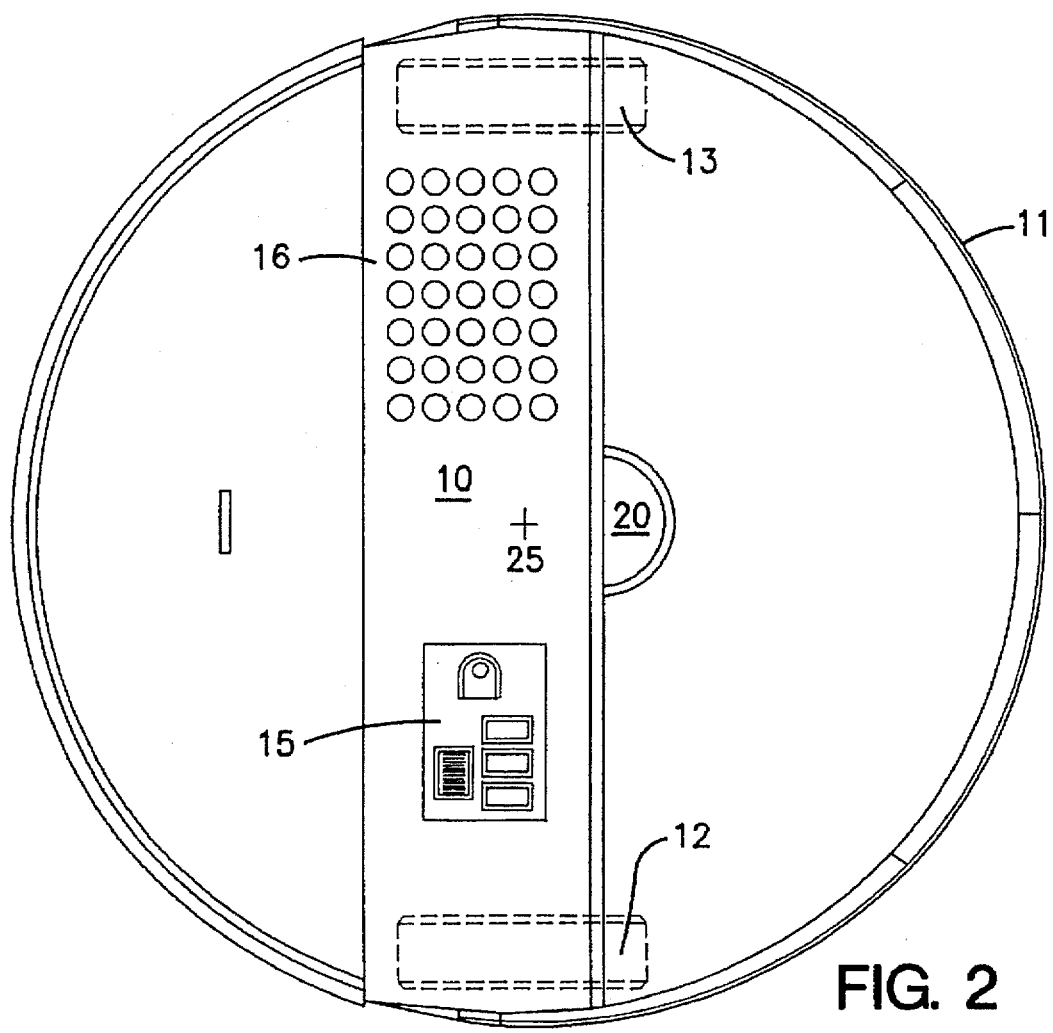
FIG. 2 demonstrates a plan view of the vacuum cleaning robot of FIG. 1.
Figure 3:
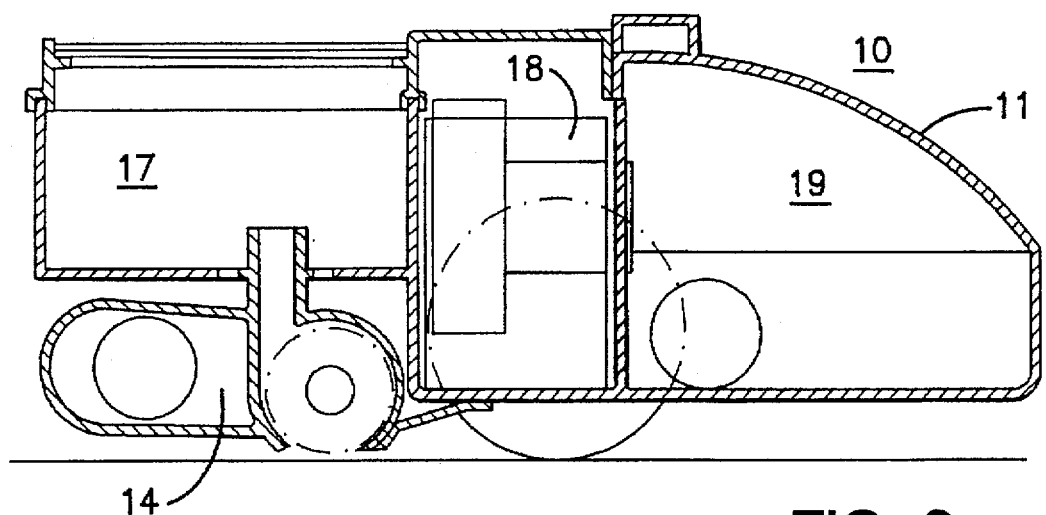
FIG. 3 demonstrates an elevated cross section view of the vacuum cleaning robot of FIG. 1.

In FIG. 1, in a right side view, and in FIG. 2, in a plane top view, is disclosed an illustrative embodiment of an autonomous vacuum cleaner 10, which applies the method of the present invention. The vacuum cleaner 10 comprises in principle a circular housing 11 provided with two driven wheels 12 and 13. On the housing 11 there is a control panel 15 provided with controls and indications for the device according to the state of the art, as well as an outlet of air from the vacuum cleaning unit 14 of the device. FIG. 3, in a simplified picture, demonstrates a cross section of the vacuum cleaner 10, which shows that the housing in principle comprises 3 compartments, a rear compartment 17 for collection of dust above the vacuum cleaning unit 14, a central compartment 18 for heavier components like an accumulator battery and driving motors, and a front compartment 19 for the remaining equipment, for example a microprocessor and associated printed circuit boards and electronics for the transmitter and receiver for the orientation and for the guidance of the vacuum cleaner during its operation. Additionally a front portion of the housing 11 at a space 19 constitutes (FIG. 3) a mechanical sensor movable in the x and y directions to also mechanically sense an obstacle when, for instance the vacuum cleaner 10 moves in underneath a sofa or the like of insufficient height. Up on the top of the movable portion of the housing 11 there is placed an omnidirectional ultrasonic transmitter 20 which, together with a number of ultrasonic microphones, are used for detection of obstacles within a proximate zone in front of the vacuum cleaner. In the illustrative embodiment the ultrasonic transmitter is a cylinder having a diameter of about 15 mm, which sticks up about 20 mm above the housing 11, and on top being provided with a sound absorbing plate onto which then additionally is placed an IR receiver. Thus, in this embodiment the housing 11, the ultrasonic transmitter 20 and the mechanical device 21 constitute an integrated unit also for a mechanical sensing.

Figure 4:
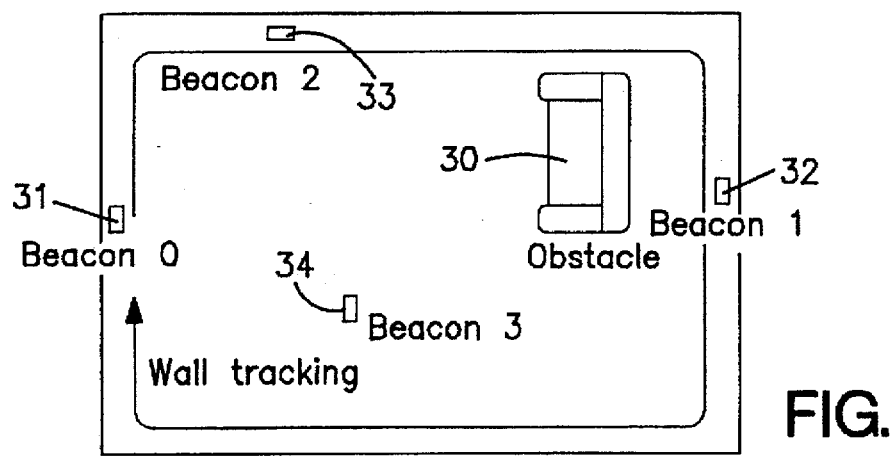
FIG. 4 shows a room provided with a number of active beacons or transponders and where the vacuum cleaning robot of FIG. 1 will orientate by first encircling the room along the walls.
Figure 5:
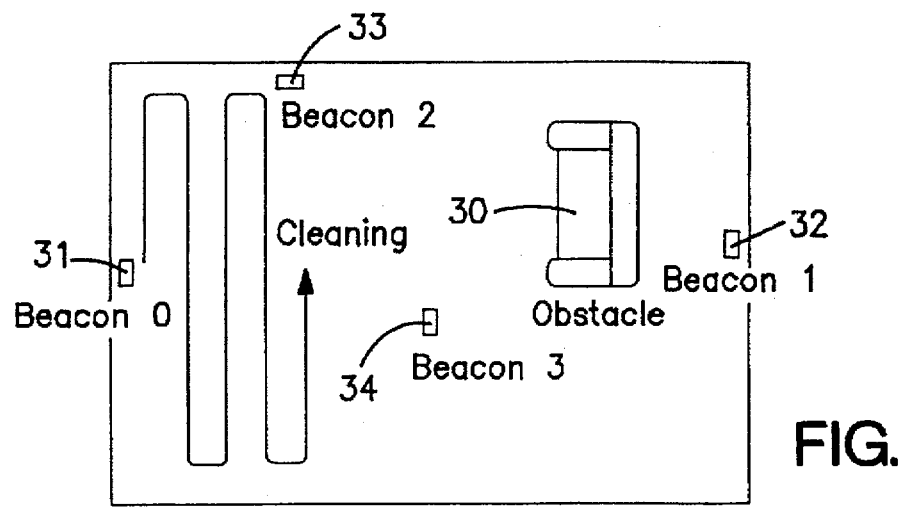
FIG. 5 shows the way the vacuum cleaning robot according to FIG. 1 in principle will do its cleaning action after having explored the room.

In FIGS. 4 and 5 a principle is demonstrated of a way the vacuum cleaner performs an automatic cleaning of a room. In the room of the example shown there is, for instance, a sofa 30 and the room is further in this case provided with four transponders 31–34 for the orientation of the vacuum cleaner. In this example all of the transponders are within the area to be cleaned, but it should be noted that a transponder very well may be positioned out of the bounded cleaning area. When the vacuum cleaner is to perform an automatic cleaning of the room it starts in a traditional way to at first make one full round around the room with wall tracking, along the walls limiting the room, starting from transponder 31 or "beacon 0". During the wall tracking the wall is registered by means of the ultrasonic device, the wall all the time being present on the left side of the apparatus when the apparatus is making a right hand round at the same time as it is vacuum cleaning. Additionally the transponders 31–34 are registered by means of a system in which the transponders are active and respond on another frequency when the transponders have registered a transmitted ultrasonic pulse from the apparatus. In the illustrative embodiment such a sound pulse is transmitted every hundred milliseconds during that the apparatus simultaneously is moving. By means of the responses from the transponders and at first the motion along the wall the microprocessor then builds up a kind of an image of the room, where the exact positions of the transponders will be better and better determined the longer the apparatus is travelling during this orientation round, and at the same time it is performing a cleaning function along the path covered. During this round the sofa 30 in the demonstrated example will also be registered by the ultrasonic device and will be placed into the "map" being generated of the room. This map in the form of a predefined network of squares is successively further filled with data when the room is being vacuum cleaned. The ultra sound transmitter is placed on the portion of the housing 11 such that its position differs from a rotational center 25 of the device. Immediately after that the device has left the starting position at the transponder 31 (beacon 0) in FIG. 4 and started its wall tracking the device 10 is rotated one turn around its rotational center 25 at the same time as it is measuring the distances to all the available transponders or beacons. By means of this method a minimum in the distance to each available transponder is obtained when the transmitter means 20 is situated at a position immediate to a straight line between the rotational center 25 of the device and a respective transponder. By means of this method coarse determinations of the directions (of the order ±5°) to each transponder are obtained, which facilitates the final calculation of the positions of the different transponders. Also at a later position the rotation around its rotational center may be repeated to further obtain an estimate of the directions to the different transponders by this method and above all to obtain directions to previously hidden transponders.

After one turn around the room has been completed the vacuum cleaner is prepared to by it self perform its automatic cleaning of the remaining surface of the room, which is illustrated in FIG. 5. The microprocessor then calculates a motion pattern such that the entire surface will be covered by the apparatus and at the same time with a suitable small overlapping. The device now will utilize the "map image" and verify the travel of the apparatus by comparisons with the positions of the transponders and by means of the path covered as registered by the wheels besides information obtained from the ultrasound radar. By means of separate driving motors for the wheels 12 and 13 and their diametrical position the apparatus may comfortably whenever needed be rotated around its rotational center 25, which then is the origin of the circle constituting the limiting line of the housing 11. By registering the rotation of the wheels during the rotation around the rotational center of the device information is simultaneously obtained about the turning angle in relation the starting position when the rotation of the device was started. This angle information is utilized by a subroutine of the microprocessor system which looks for a minimum in the distance variation towards each beacon during the rotation. The driving motors in an illustrative embodiment are for example step motors having the designation KH56HM2-501 from Japan Servo Co LTD.

Simultaneously as the apparatus is moving the ultrasonic system performs a proximity area sensing within a range 0–40 cm to detect possible obstacles. When the apparatus has registered an obstacle it first turns around and continues the surface cleaning of all open surfaces. Thereafter cleaning is performed around obstacles by, for instance, making a full turn around the obstacle, if this is possible, before it continues to the next obstacle. After completed cleaning the robot returns to the starting position for charging.

Thus with this generally described system a vacuum cleaner or "dust cleaning robot" is obtained, which by itself with a starting position from a point in a room automatically is capable of performing a vacuum cleaning of the room after it received a command for this. In the illustrative embodiment the "beacon 0" constitutes a docking point for the device, where it normally is in idle and may then recharge its built-in accumulator and where it may return for additional charging if the apparatus from a previous charging of the accumulator is unable to complete a vacuum cleaning of the entire room. The transponders 31–34 additionally are, in this case, of an active type, which has an own power supply, either by means of a battery or by for example being connected to available power outlets, which in the described embodiment is applicable for the docking transponder 31 to obtain charging current for the accumulator. In FIGS. 4, 5, 6 and 8 the transponder 34 is typically self supported by means of a battery, while transponders 32 and 33 like the docking transponder 31 are connected to available power outlets. The transponders 32 and 33 in appearance remind of small lamp devices which sometimes are inserted into power outlets to in dark generate guiding light. Thus, in principle, regarding the height above floor, the transponders may be placed freely and the only one which by necessity must be present on a wall and at the floor will be the starting and docking transponder 31. Anyhow, according to the preferred embodiment the height of a transponder is for instance limited to 1 m above the floor to be able to reduce radiation upwards from the ultrasonic transmitter and thereby reducing the number of unwanted reflections from above which contribute to the general noise background. Also tables and chairs will screen the ultra sound radiation upwards, which implies that a transponder may not "hear" the robot.

Here as an illustrative embodiment a vacuum cleaner has been described, but the invention is of course applicable to any autonomous robot, for instance, for any other kind of cleaning function, e.g., like floor polishing.

Short Description of the Orientation Function

Figure 6:
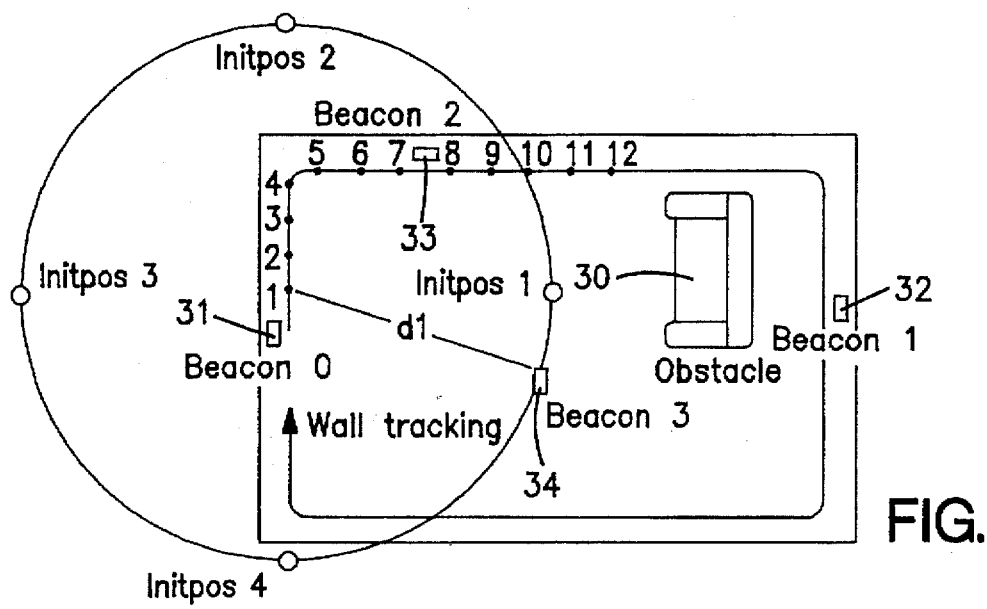
FIG. 6 demonstrates a generally basic picture for estimation of the position of a transponder by means of a built in sensing function.

For the orientation function an orientation device is used, which additionally comprises a number of subroutines for the microprocessor of the device to in part guide the robot each 20 milliseconds and in part for positioning. At the start of a wall tracking the position of all the transponders is unknown except for transponder 31, i.e., the "beacon 0", which is used as starting point for the orientation and thus constitutes origin in its own coordinate system. This may in a certain degree be improved by always ensuring that an additional transponder is present along the same wall as the starting point. In FIG. 6 is shown a starting position where a sound pulse is registered by "beacon 3", i.e., transponder 34. The time, e.g., for an ultrasonic pulse to propagate from an ultrasonic transmitter 20 of the vacuum cleaner 10 to the transponder 34 gives a measure of the distance to the transponder. The transponder in turn acknowledges that it has detected the ultrasonic pulse by means of transmitting back on another frequency, e.g., a light pulse or a radio wave pulse, to a receiver in the vacuum cleaner. The time for this electromagnetic wave to propagate back is comparatively negligible and deduced from the time period from that the pulse was transmitted until it was detected by the transponder the distance $d_1$ to the transponder is achieved. It is then obvious that the transponder is situated somewhere along a circle having its origin at the transmitter 20 and a radius equal to $d_1$. By performing the rotation mentioned previously around the rotational center of the device, except for the distance, also a coarse estimate of the direction is obtained by this rotation.

Figures 7A, 7B:
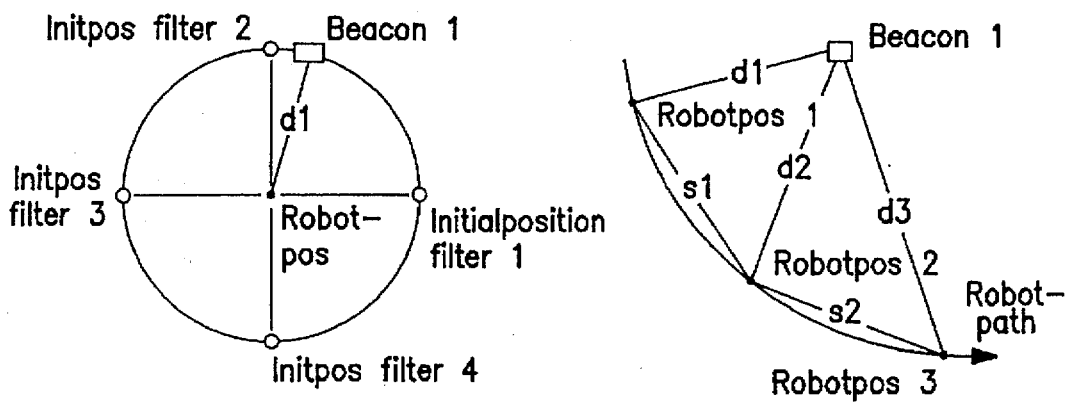
FIG. 7(a) shows in part estimation of the position of a transponder by means of an hypothesis method.
FIG. 7(b) shows in part estimation of the position of a transponder by means of a geometric path estimation.
Figure 8:
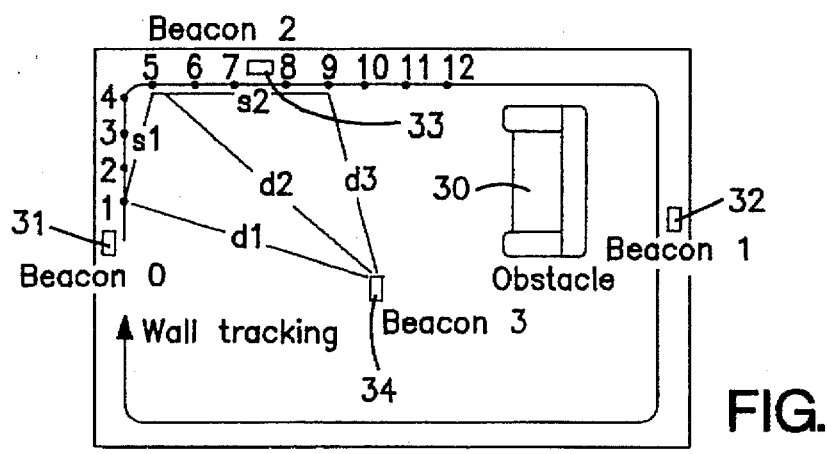
FIG. 8 shows orientation towards a transponder during a first encircling of the room.

The measured values obtained always must be handled as uncertain values, which implies that these must be further processed in a suitable way for example by some filtering method or by a calculation of probability. Thus, one way to position the transponder i relation to the robot is for example to apply a hypothesis method, demonstrated in FIG. 7(a), which means that for each transponder is tested a number of, according to FIG. 7(a) for instance 4, parallel Kalman filters. (A complete description of the Kalman equations may for example be found in A. Gelb "Applied Optimal Estimation", MIT Press, 1975 and H. Sorenson "Kalman Filtering: Theory an Application", IEEE Press, 1985). Also other types of filters may of course be applicable. Thus, this corresponds, in FIG. 7(a), to four different hypotheses, from which one gradually will be chosen. When the transponder distance $d_1$ is achieved the initial position of the transponder in the respective filter are assigned ($x_{robot}+d_1$, $y_{robot}$), ($x_{robot}$, $y_{robot}+d_1$), ($x_{robot}$, $y_{robot}-d_1$) and ($x_{robot}-d_1$, $y_{robot}$). If no filter converged all hypotheses are rejected and the method is repeated. After finding a "best estimate" this value may be used in a new calculation set where all collected values are again used, but in reversed order. The result then obtained has a higher accuracy than the first one obtained.

Basically only the distance to the beacon is measured, but nothing is known about the direction. If the Kalman filter obtains very wrong stating values for the beacon position, the filter will not converge. By introducing the rotation of the device already mentioned and thereby obtain an early estimate of the direction the hypothesis, having the best probability to converge, may be directly chosen and at the same time the essential part of the hypotheses may be omitted. Therefore it is very probable that even before the device has made the first round travel there will be no more than one hypothesis for each beacon position. Then the calculations of the beacon positions may be interrupted and the device may start to use the respective beacon in the estimations of position. (If some beacon has not got a determination of acceptable accuracy the estimation of beacon position is of course continued for that one to obtain a better accuracy.)

Another method of positioning the transponder may be performed by geometrical course determination. This method is sketched in FIG. 7(b) as well as in FIG. 8 and relies on that the robot has travelled so far that two "legs" $s_1$ and $s_2$ may be generated which together with the transponder distances $d_1$, $d_2$ and $d_3$ form the basis for a trigonometric calculation of the transponder position. The course determination then preferably forms an initial value to the Kalman filter. To obtain a sufficient accuracy the method demands that $s_1$ and $s_2$ are of enough length and intersect with a certain minimum angle. The method is in part prolix, as all measured transponder distances between positions 1 and 2 must be stored (they will be filtered afterwards when the initial value finally has been determined). Besides certain geometries combined with an unfavorable furnishing may imply that the transponder only is visible occasionally, which may signify that two "legs" are never generated.

A positioning of one transponder 34 is illustrated in FIG. 6, whereby a sequence must be run through for each transponder being detected. The principal elements of such a sequence is, for example, as below:

a) The robot moves from the transponder 31 and obtains the distance to the transponder 34. The first measurement $d_1$ is obtained at sample 1.

b) Now a filter program in the microprocessor is started, in the Figure with four Kalman filters (in the practical embodiment in reality 12). The initial position of each filter is uniformly distributed on a circle of radius $d_1$.

c) Each new sample is input to respective filter. In the FIG. 4 filters are operated in parallel with the same data (samples 1, 2, 3, ... ).

d) Samples 1, 2, 3, ... (the transponder distances) are stored together with the robot position. Those will be used later for a repeated filtering of the best hypothesis.

e) The filtering goes on until a filter in part has built up (reached a given accuracy) and in part has converged, i.e., that the residue of the difference between the expected and measured transponder distance falls below a given value.

f) The result of the best hypothesis is checked regarding likelihood. Thereafter a refiltering takes place with the output data of the best hypothesis as initial value of the transponder, which gives a better accuracy. Finally the transponder position is transferred to the navigational portion (for example in form of a map image) and is used for positioning of the robot.

If by a primary estimation of the direction a number of hypotheses may be rejected this results in an essential improvement in that a smaller calculation capacity is needed by the central microprocessor for the positioning of the transponders. When the robot completed one full turn around the room the positions of all transponders in the illustrative embodiment are to a good accuracy put into a "map image" which is limited by the walls of the room, and are also put in possible other obstacles, which the ultrasonic system for the proximity range did discover during this go-around. After this the robot start its cleaning function by in its map image follow a calculated pattern to cover the entire surface of the room.

The course of events is periodic and will be repeated each 100 milliseconds. The main points being run through in each period is according to the example:

a) the robots transmits an ultra sound pulse having a time separation of 100 milliseconds. The pulse reaches the transponders which in the preferred embodiment respond with their identity by means of infrared light after a delay (of the order 40). The response from the transponder is then repeated after an individual delay which is stated in the response code. This decreases the possibilities for the transponders "to intervene by talking simultaneously". The time running from that the sound pulse is transmitted until the light response is received (with compensation for eventual delay) give a measure of the distance from the robot to the transponder.

b) A digital signal processor, for instance of the type TMS320C50 made by Texas Instruments, measures the mentioned time interval for all the transponders. Then a time stamped distance for each transponder is achieved, except for those which for the moment are being hidden. In the example of FIG. 5 measurement from the transponders 31, 33 and 34 are obtained, where both last are considered being positioned according to the previous chapter. The transponder 31 is always in the origin of the orientation system.

c) The measurement is transferred from the signal processor to the microprocessor, in the illustrative embodiment being a MC68332 made by Motorola.

d) The Kalman filter now performs a prediction, in other words the apprehension of own position by the filter is moved forward from the previous point of measurement to the present. This is performed in that a new position is obtained from the path generation, which in turn bases the information in a dead count by means of the wheels 12 and 13 according to as such well known technique. Except for performing a primary calculation of the position of the robot this technique further demands that a so called matrix of covariance is predicted (also see A. Gelb "Applied Optimal Estimation", MIT Press, 1975 and H. Sorenson "Kalman Filtering: Theory and Application", IEEE Press 1985). In the Kalman equations wheel speeds are assumed as input data, but as the path generation already has integrated these to a position this is directly input to the filter. The concepts are equivalent, but the preferred method gives an increased accuracy as the path generation guides the vehicle each 20 milliseconds and thus works 5 times as often as the sensing transmitter.

e) for each measurement a weighting is now performed one after another. Then the filter combines the predicted robot position with the respective transponder distance such that a new and better estimate of the own position is obtained. Besides for each moment the matrix of covariance is updated.

f) When all transponder distances have been weighted a position manager writes is new apprehension of own position together with time of the measurement into a data area and marks by a flag that new information is available. The path generation reads the data and cancels the flag.

All calculations are implemented in the illustrative embodiment using integer arithmetics, whereby scaling is applied according to the table below. By "scaling" is meant the value of the least significant bit, while "length of word" means the number of bits used to represent the quantity.

| Quantity | Scaling | Length of word |
|---|---|---|
| Distance | 1 mm | 16 |
| Angle | 90°/1024 | 16 |
| Position | 1 mm | 16 |
| Time | 1 ms | 32 |

In a preferred embodiment of the device the same ultrasonic pulse is used for sensing of a proximate area (of the order 0–40 cm) in front of the robot by means of five receiving means for the reflected ultra sound, which are distributed on the forward case 5 in principle in front of the ultra sound transmitter 20 on the vacuum cleaner 10. Each such receiving means then operates within a time slot after transmission of the ultrasonic pulse, which corresponds to an immediate proximate area and serves to discover additional obstacles, which were not discovered during the first exploring tour around the room. Additionally at least one of these receiving means is used to control the vicinity of the wall at the left side in the first exploring right hand round.

Additionally in a preferred embodiment of the method and the system according to the present invention a first response from the transponder on the second frequency is delayed, i.e. in this case the IR signal back to the robot, by a first fixed delay (of the order 40 ms) to give the microprocessor additional time for processing echoes from the proximity area registered by means of the receiving means on the robot. Subsequently a second response is additionally transmitted having a second delay (of the order 5–20 ms) which is individual for each transponder to provide the system with another possibility to separate two transponders, which with their first response have been responding simultaneously. The IR signal then contains in a known manner a pulse code identifying each transponder and in the illustrative embodiment 8 bits are used from which 4 bits are utilized for the identification, which using ordinary binary counting gives 16 different identification addresses. As a transponder will respond earliest about 40 ms after the transmission of a pulse from the vehicle a transponder may theoretically be positioned more than 100 m from the vehicle based on the propagation velocity of a longitudinal sound wave.

In another embodiment of a system for orientation by means of one or more transponders a triggering signal is instead transmitted to the transponder on a second frequency preferably having a fast propagation, e.g. via IR light of an electromagnetic wave, whereby the transponder responds by means of a first frequency having wave type of slow propagation, preferably an ultra sound wave. In this case the measurement of distance takes place from the transponder to the autonomous device instead according to the first embodiment from the autonomous device to the transponder. This means that in the latter embodiment is placed in the mobile device the part of the logic which handles this measurement of distance and the estimate if an obtained measure of distance is within an expected measurement window. In this second embodiment this results in that the mobile device may if desirable also in a sequence trigger the transponders one by one to obtain a response on the frequency of slow propagation to measure the distance to each transponder of interest by utilizing its unique address. Besides in a further embodiment of this second embodiment it is additionally possible, like before, to obtain a further safety level in the system, have the transponder still identify by the signal which is transmitted by the transponder. In the latter embodiments the mobile device is, instead of the receiver for, e.g., IR light or any other electromagnetic way, provided with an extra transmitter for a signal of this type, at the same time as the receivers with their accompanying electronics for the ultra sound radar, which is used for the proximity sensing, also if desired be used for the registration of the responses from the transponders. Any further detailed description of this latter second embodiment should not be necessary for a person skilled in the art, which from the previous detailed description of the first embodiment will, in full analogy with that, completely realize the way of operation of the second embodiment of the transponder system and the transponder device.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. A method for faster measurement of a direction to orientation beacons for an autonomous device, which is provided with a pair of wheels and driving motor means which will make said autonomous device rotate in its entirety at least one turn around a rotational center of said autonomous device, said autonomous device comprising a microprocessor system for the orientation and guidance of the autonomous device, an orientation system comprising at least a transmitter means and a receiver means, and in the area in which the autonomous device should act a number of transponders are arranged, which said microprocessor system utilizes for its orientation in the area for performing a function, wherein said transmitting means of said autonomous device is arranged in a position being different from said rotational center of the autonomous device; comprising the steps of, rotating said autonomous device in its entirety at least one turn around said rotational center when said autonomous device leaves a docking position having a first known transponder of beacon, while measuring distances to all available transponders; registering for each transmitted sensing signal the rotational angle of the device related to a position when the rotation was started; calculating a distance minimum to a respective transponder when the transmitting means of said autonomous device is in a position immediate to a straight line between the rotational center of said autonomous device and a respective transponder; and determining an immediate coarse of a direction to each available transponder.

2. The method according to claim 1, wherein the rotation around said rotational center is repeated at least once when said autonomous device has traveled a predetermined distance from the starting point of the travel.

3. The method according to claim 2, wherein the measurement of the direction and distance to a transponder utilizes two different frequencies, one of which having a relatively slow propagation and the other frequency having a high propagation speed, whereby a first frequency is constituted by an acoustic wave and a second frequency is constituted by an electromagnetic wave.

4. The method according to claim 3, wherein said first frequency is constituted by an ultra sound wave, while said second frequency is constituted by an IR light signal or a radio signal.

5. The method according to claim 4, wherein said first frequency having the slow propagation is omnidirectionally transmitted from the transmitting means of said autonomous device.

6. The method according to claim 5, wherein a response on said second frequency of fast propagation is delayed from a transponder by a predetermined period of time to give said autonomous device time to process reflections received on said first frequency for the sensing of the distance and direction to a transponder.

7. The method according to claim 6, wherein each transponder is identified by the microprocessor from the content of a response on said second frequency in which is stated the unique identity of the transponder.

8. The method according to claim 7, wherein after transmission of a first response from each transponder indicating a reception of a signal on said first frequency, an additional signal is transmitted after a predetermined time interval, which is different and unique for each transponder, to thereby separate transponders, the first response of which being simultaneously received by the receiving means in said autonomous device.

9. The method according to claim 8, wherein one of the additional transponders always is positioned along the same wall as along which the docking position of the first and known transponder is found.

10. A method for measurement of direction between orientation transponders and an autonomous device, said autonomous device having (a) wheels and driving means for moving said autonomous device relative to said transponders and for rotating said autonomous device in its entirety at least one turn around a rotational center of said autonomous device, (b) a microprocessor system for orienting and guiding said autonomous device relative to said transponders, and (c) an orientation system comprising transmitter and receiver, said transmitter being at an offset position relative to said rotational center, comprising the steps of:

(i). moving said autonomous device from a docking position and rotating said autonomous device in its entirety, from a starting position, at least one turn around said rotational center, said rotating of said autonomous device simultaneously rotating said transmitter around said rotational center at said offset position;

(ii). transmitting first signals from said transmitter to all receptive transponders during said rotating;

(iii). transmitting responsive second signals from each respective receptive transponder to said autonomous device;

(iv). measuring and registering distances between said autonomous device and each receptive transponder based upon respective first signals and respective second signals;

(v). measuring and registering rotational turning angle of said autonomous device relative to said starting position and each receptive transponder; and (vi). processing respective measured and registered distance of step (iv) and rotational turning angle of step (v) to obtain a respective minimum in distance between said autonomous device and each respective receptive transponder when said transmitter is situated at a position on a straight line between said rotational center and a respective receptive transponder, and obtaining an immediate coarse determination of a direction between said autonomous device and said respective receptive transponder.

* * * * *